United States Patent

[11] 3,607,044

[72] Inventors Ferdinand List;
 Helmut Alfs, both of Marl, Germany
[21] Appl. No. 763,362
[22] Filed Sept. 27, 1968
[45] Patented Sept. 21, 1971
[73] Assignee Chemische Werke Huls Aktiengesellschaft
 Marl, Germany
[32] Priority Oct. 14, 1967
[33] Germany
[31] C 43573

[54] PROCESS OF IMPROVING FORMED SILICA GELS
 3 Claims, No Drawings
[52] U.S. Cl. .................................... 23/182,
 252/447
[51] Int. Cl. ...................................... C01b 33/16
[50] Field of Search ............................. 23/182 V,
 182, 182 P; 252/449

[56] References Cited
 UNITED STATES PATENTS

| | | | |
|---|---|---|---|
| 2,093,454 | 9/1937 | Kistler | 23/182 UX |
| 2,757,073 | 7/1956 | Drexel | 23/182 |
| 2,865,782 | 12/1958 | Strassburg | 23/182 X |
| 3,053,627 | 9/1962 | Flemmert | 23/182 |
| 3,079,234 | 2/1963 | Jenkins et al. | 23/182 |
| 3,161,468 | 12/1964 | Walsh | 23/182 |
| 3,250,726 | 5/1966 | Martinek et al. | 23/182 X |
| 3,328,124 | 6/1967 | Mays et al. | 23/182 |
| 3,363,979 | 1/1968 | Schwartz et al. | 23/182 |
| 3,367,742 | 2/1968 | Marotta et al. | 23/182 |
| 2,698,305 | 12/1954 | Plank et al. | 252/449 X |
| 3,208,953 | 9/1965 | Klass et al. | 252/449 X |

OTHER REFERENCES

Chemical Abstracts, 1951, Vol. 45, page 6037.

*Primary Examiner*—Edward Stern
*Attorney*—Pierce, Scheffler & Parker

ABSTRACT: Formed bodies of silica gel are hardened, without adversely influencing activity, by treating the bodies with vapor of a low molecular weight alcohol (e.g. methanol) containing up to 3 volume percent of water vapor, at a temperature gradually rising from 100° to 350° C., during a period of 20–120 minutes, and thereafter slowly cooling the so-treated bodies.

PROCESS OF IMPROVING FORMED SILICA GELS

This invention relates to silica gel, and is concerned with a process of improving formed, pure, silica gels.

Formed silica gels, described for example by Ullmann, "Encyclopaedie der technischen Chemie," (1964), Volume 15, at pages 723 and 724 are primarily utilized as drying agents, adsorbents and catalysts. As such, they can contain various additives or admixtures, especially aluminum oxide. The formed silica gels can be provided in the form of beads or, by mechanical shaping, in the form of lumps. The particles should possess the greatest possible hardness in view of their specific use.

It is known that abrasion resistance can be increased by dispersion of finely divided solid additives in the silicahydrosol which is used for the preparation of the gel (DBP) i.e., German Pat. No. 1,096,336. However, it is necessary in this case to adhere to very specific particle sizes of the additives; furthermore, these substances usually differ chemically from hydrosol and will therefore often cause undesirable reaction characteristics in case of catalytic processes. It has been proposed also to eliminate shrinking of the fresh hydro-gel granules during the drying process by initial and full replacement of the water content by alcohol, keeping the alcohol in the liquid state by a combination of heat and pressure, finally allowing the alcohol to vaporize (DBP (i.e., German patent) 896,189, page 4). DBP (i.e., German patent) 878,637, page 8 proposes the calcination of the gel particles in the presence of air, vapor, an inert gas or a mixture thereof. In DBP (i.e., German patent) 885,397 the object of the invention is the prevention of the disintegration of the grain of the fine-pored silica gels, caused by contact with water, by a prior treatment of the gels with moist gases at normal temperatures. Finally, DAS (i.e., German published patent application) 1,172,245 published 18th June 1964, discloses the hydrophobic treatment of finely divided silica gel at higher than room temperature by surface esterification with alcohols, whereby the active surface of the silica gel is covered by a "skin."

None of these known processes, however, permits an enduring hardening in simple manner of the surfaces of formed pure silica gels without adverse influence on the activity of the gels or without change in composition due to the incorporation of undesirable inorganic solids.

The present invention is designed to solve this problem.

According to the present invention the problem hereinabove explained is solved by treating the formed pure silica gels within a period ranging from 20 to 120 minutes at a temperature rising from 100 to 350° C. with the vapor of a low molecular weight alcohol, which treating agent may contain up to 10 volume percent of water or up to 3 volume percent of acetic acid, and thereupon cooling the gel gradually.

Formed pure silica gels which can be improved in accordance with the invention are gels which are obtained in solid, dry and active form after any forming process from pure silicic acid sols upon dehydration and, possibly, calcination. Binding agents such as silicic acid, or possibly organic binding agents, may be added to the otherwise pure gels.

It is most advantageous to process finely porous gels, especially in the form of beads.

The process of the invention consists of the gaseous treatment of the gel particles with low molecular weight alcohols for a certain period of time, suitable alcohols including methanol, ethanol, propanol, isopropanol, the butanols and the amyl alcohols, especially methyl alcohol. The alcohol can be pure, or it may contain water in vapor form up to 10 volume percent, especially between 1 and 3 volume percent, and preferably 3 volume percent The presence of a small amount of acid, for example 1 to 3 volume percent of acetic acid, can also be advantageous.

The steaming of the silica gels is accomplished at temperatures between 100° and 350° C., preferably between 250° and 300° C. It was found that it is particularly advantageous to guide the water-containing alcohol through the gels at a temperature which rises from 250° to 300° C., the increase being accomplished gradually and slowly, for example from 240° to 300° C. over a period of 30 minutes, because the grains can burst if heated too rapidly.

Steaming treatments ranging from 20 minutes to 2 hours are most appropriate. The required—or, advantageous—period of time depends to some extent on operating conditions but a period of approximately 60 minutes is usually necessary in order to improve the gels significantly. Obviously, this requirement can be lowered if less effective results would be acceptable. Periods in excess of 60 minutes are not needed in most instances, but the treatments can be extended without adverse effects.

The process can be carried out by utilization of any suitable type of apparatus, for example upright or horizontally placed pipes filled—either completely or in part—with the formed gels. It often is advantageous to accomplish the treatment in the same apparatus in which the gels are subsequently to be used. For example, the steaming can be carried out in a drying tower, or in a horizontal rotary furnace in which the gels will be employed, later on, as esterification catalyst. The methanol treatment can be carried out either with the formed gel in a fixed layer or in a fluid bed. The steaming in a rotary tube, possibly also in a fluid bed, offers the advantage that the flow of heat within the granular material as well as the methanol concentration within the mixture will be completely uniform (thereby avoiding any channeling. After the steaming operation the gels are cooled off slowly, whereafter a highly activated material of great solidity is available immediately.

The material so obtained is especially suitable in connection with processes in the course of which the gel particles are moving and are therefore subject to abrasion; obviously, however, the advantages attained by the novel method apply also in the case of gel particles which are employed in connection with other processes, because hardness and resistance to abrasion, made possible without any adverse effects, are always useful.

The improvements, made possible by the new process, are demonstrated on the basis of a practical example whereby the gel particles are being moved in a very pronounced manner.

Example 1: Esterification of terephthalic acid with methanol in a rotary furnace.

A horizontally disposed 64 made of alloy steel, for example, chromium-nickel-molybdenum (-18-8-2) steel, of 700 mm. length and 125 mm. diameter is used as a rotary furnace. 40 volume percent of the pipe is filled with silica gel beads of 3 to 5 mm. grain size, produced by the firm of Kalichemie, Hannover, Germany. The furnace is heated electrically to a temperature of 300° to 320° C. Agitators rotate within the furnace, designed in such manner that crushing of grains is avoided as much as possible. The gaseous reaction products (dimethylterephthalates, DMT, monomethylterephthalate MMT, water) are drawn off together with the excess of methanol at the upper end of the furnace, opposite to the point of charge. In order to remove catalyst dust and any impurities introduced by the terephthalic acid, the flow of gases is conducted subsequently through a cyclone separator and is guided from there through a bed of solid catalyst with a 10 liter volume, filled with coarse-grained (3 to 8 mm.) silica gel. Within this final reactor, heated electrically to 320° C, the esterification is completed, with small quantities of MMT (approximately 5 to 10 percent which at high loads can escape from the rotating furnace with the flow of gas being converted quantitatively to diester. The vaporous discharge is then conducted over a suitable condenser system, forming a suspension of methanol and DMT which can be further processed in known manner by filtration, drying and distillation to obtain the desired end product An esterification is carried out under atmospheric pressure for 150 hours at the following specifications:

Charge:
TPS: 270 kg. 98.2%=265 kg. of 100% TPS=1.76 kg. per hour
$CH_3OH$: 820 kg.=5.46 kg. per hour Discharge:
  DMT unwashed: 282 kg., SZ=1.14
  Mother liquor: 833 kg. with 2.86% of solids=23.8 kg.
    SZ within the solids=92.2=29.6% MMT=7.1
    kg. of MMT 282.0 kg. DMT, SZ=1.14=0.35% of MMT
                281.0 kg. DMT+1.0 kg. MMT
23.8 kg. DMT (mother liquor) SZ=92.2=29.6% of MMT $$= \frac{16.7 \text{ kg. DMT} + 7.1 \text{ kg. MMT}}{297.7 \text{ kg. DMT} + 8.1 \text{ kg. MMT}}$$
$$\quad\quad 97.3\% \quad\quad\quad 2.7\%$$

Yield (relative to DMT): 96.0% of the theory
Yield (relative to DMT+MMT): 98.5% of the theory
Yield, volume/time 250 g. of DMT/liter and hour During the course of this continuous esterification process 300 g. of fine catalyst dust will deposit within the cyclone which dust is generated in the rotary furnace by mechanical abrasion, approximately equivalent to 1 g. of catalyst loss per 1 kg. of DMT produced. In addition thereto, there is detected in the solid catalyst bed the bursting of some silica gel granules (300° C, water-concentration in the gas stream of up to 10 percent), with grain fragments up to 1 mm. size being generated thereby. This causes—after extended periods of operation—an increase in the gas resistance within the solid catalyst bed to 0.3–0.4 atmospheres gauge pressure.

The above test is now repeated, the commercially available silica gel beads being replaced by beads which have been pretreated prior to the esterification proper,—that is, prior to the introduction of the TPS,—in the rotary pipe with methanol vapor under addition of approximately 3 percent of water in the form of steam at a temperature rising slowly from 250° to 300° C. over a period of approximately 1 hour.

The resulting esters are obtained through the esterification process at yields which are practically identical with the yields listed above. However, after an operation of 150 hours the fine catalyst dust collected in the cyclone amounts to only 50 g. Also, upon completion of the esterification the gas resistance within the bed of solid catalyst, charged with silica gel beads which are identical with the beads used in the first test, remains unchanged at 0.1 atmospheres gauge pressure After opening the bed, the beads upon careful examination were found to be unchanged in shape and size.

Example 2: The magnitude of the coarse-grain disintegration under the esterification conditions can be demonstrated by the following test:

The reaction pipe has a diameter of 50 mm. and a length of 1,000 mm. and is equipped with an electrical heating jacket. The lower part of the reaction pipe is filled with 100 g. of TPS and 500 ccm. of catalyst in through admixture. The upper part of the pipe is filled with Raschig rings. The methanol, added from above drop by drop, is vaporized and superheated there. Within the lowest portion of the reaction pipe there is installed a perforated porcelain plate. The bottom of the pipe is grounded and placed onto a 2-liter round-bottomed flask. This flask is provided with a high-reflux condenser in which the superheated methanol will condense so that methanol and DMT will collect in this flask.

Commercially available particulate silica gel, 3 to 8 mm., with fine pores (made by Gebr. Herrmann, Koeln, type E) is screened through a 2.5 mm. mesh wire in order to remove any fine dust particles until constancy of weight is attained. 500 g. of this sifted catalyst is mixed with 100 g. of TPS and the mixture is steamed in the heated reaction tube for a period of 1 hour with 500 g. of methanol at 300° C. The catalyst is then cooled off, conducted over a 2.5 mm. screen, and the catalyst particles of less than 2.5 mm. are collected and weighted. It is found that approximately 150 g. of the initial granular material did burst, forming grain sizes from 0.8 to 1 mm; in other words 30 percent of the grain disintegrated after 1 hour.

When this test is repeated, under identical conditions excepting that prior to the esterification 500 g. of sifted silica gel beads are vaporized for 60 minutes with 500 g. of dry methanol at 250° to 300° with the agitator rotating, there will be no bead disintegration at all after 1 hour of operation. Similar results will be attained if the vapor treatment is accomplished by the use of ethanol, $n$- or $i$-propanol, a butanol or an amyl alcohol.

Example 3: 500g. of silica gel beads, diameter = 3 to 5 mm., not pretreated with methanol, are mixed with 100 g. of TPS and vaporized in a reaction tube at 300° C. with methanol as described in example 2.

After 1 hour 42 g. of DMT will collect in the receiver, which amount corresponds to a conversion of 36 percent.

The test is repeated by using a silica gel catalyst which has been pretreated in accordance with Example 1. After 1 hour 63 g. of DMT have collected in the receiver, which amounts to a conversion of 54 percent.

Therefore, pretreatment of the catalyst resulted in an increase of the conversion by 50 percent under otherwise identical test conditions.

Example 4: The compressive strength of the silica gel beads is determined as follows:

A single silica gel bead is placed between plane-parallel steel plates. The lower plate is stationary while the upper, movable, plate forms a part of a balance scale with sliding weights.

By the movement of the weight along the balance scale up to the point of bursting of the grain, the kg., expressed in kg., can be determined directly.

| Product | Test No. 1 | 2 | 3 | Pressure in kg. the average |
|---|---|---|---|---|
| Silica gel beads of 3 to 5 mm. not treated | 10 | 12 | 7 | 9.7 |
| Silica gel beads of 3 to 5 mm. pretreated with methanol | 13 | 19 | 17 | 16.5 |
| Silica gel beads of 3 to 5 mm. pretreated with 97% of methanol and 3% of acetic acid | 14 | 19 | 19.5 | 17.8 |
| Silica gel beads of 3 to 5 mm. pretreated with 97 % of methanol and 3% of water | 14 | 19 | 14 | 15.6 |

The above listed tests are representative of detailed tests carried out with 50 individual measurements each.

These examples demonstrate that the process of the invention effects a very substantial improvement in the gels even under very demanding requirements concerning the silica gels, as in the case of the process of German Pat. No. 1,224,313. This is particularly useful because this esterification method is outstandingly progressive, and because the silica gel abrasion—the only difficulty and drawback encountered in the case of this method—can now be controlled. This applies to all species of the process set forth in German Pat. No. 1,224,313. Further, it is advantageous that the process of the invention is applicable tom and valid for, all grain sizes of the gel so that the selection of size is optional, subject only to process technology. Therefore, a significant additional advantage of the esterification process is realized and maintained because this process is by far superior, quantitatively, to the solid bed methods and also not being delimited by the fluid bed methods which will operate at optimum results only if the grain size of catalyst and terephthalic acid are identical.

Example 4 demonstrates also that the very substantial increase, in the stability of the silica gel beads, attained by the invention, will improve the usefulness of the beads in connection with other processes. Example 3 shows that this improvement is not accomplished by lowering the activity; quite to the contrary, the activity is even increased.

Obviously, the process of the invention is not limited to the improvement of bead-shaped silica gel particles, but is also applicable with like advantages to material in lump forms. Such material is usually employed in stationary arrangement, for example in drying towers. But in the more rare occasions when such material undergoes movement, it will be subject to increased abrasion due to its edged structure. There fore the novel process of the present invention will be very advantageous even in case of such material.

There is an additional advantage over fresh, fine-pored silica gels which have not been subjected to special treatment, namely, that beads vapor-treated in accordance with the invention will not burst upon contact with water in liquid form.

We claim:

1. Process of hardening formed, shaped bodies of pure, solid, dry silica gel without adversely affecting the activity of the gel or bursting the grains thereof, which comprises directing through the said bodies of pure silica gel, during a period ranging from 20 to 120 minutes, at at a temperature progressively rising to from 100° to 350° C., with a vaporous treating agent consisting essentially of the vapor of a low molecular weight alcohol which vaporous treating agent contains 0–10 volume percent of water vapor, or 0–3 volume percent of acetic acid vapor, and then slowly cooling the gel.

2. The process defined in claim 1 in which the temperature of the formed gel-alcohol mixture is slowly increased through the range from 240° to 300° C. in a period of at least 30 minutes.

3. The process defined in claim 1 in which the formed silica gel is maintained in motion during a substantial part of the treatment.